April 22, 1969    YOSHIAKI IGARASHI ET AL    3,440,511
D.C. MOTOR CONTROL SYSTEM
Filed Feb. 14, 1967    Sheet 1 of 2
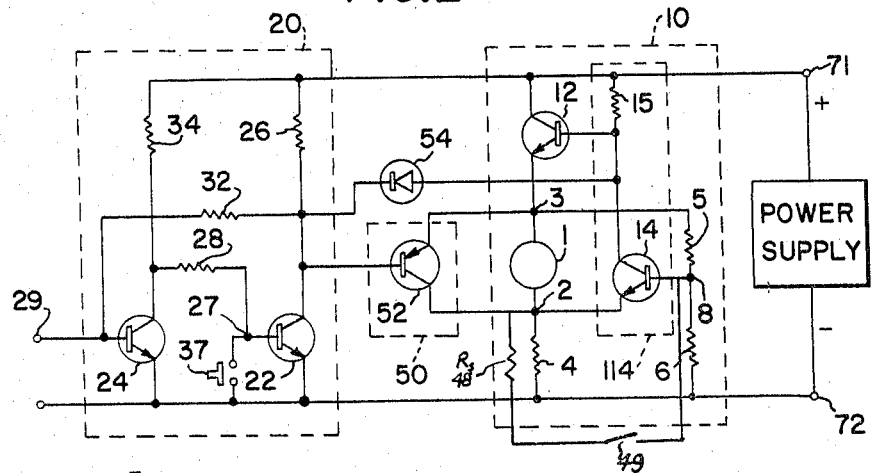
FIG.1
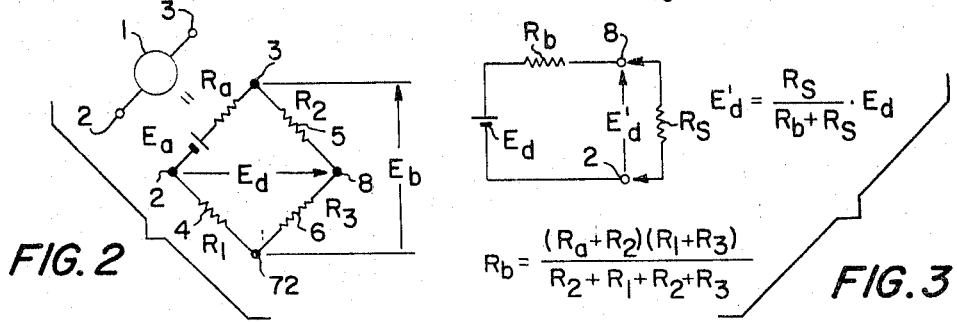
FIG.2
$$E'_d = \frac{R_S}{R_b + R_S} \cdot E_d$$
$$R_b = \frac{(R_a + R_2)(R_1 + R_3)}{R_2 + R_1 + R_2 + R_3}$$
FIG.3
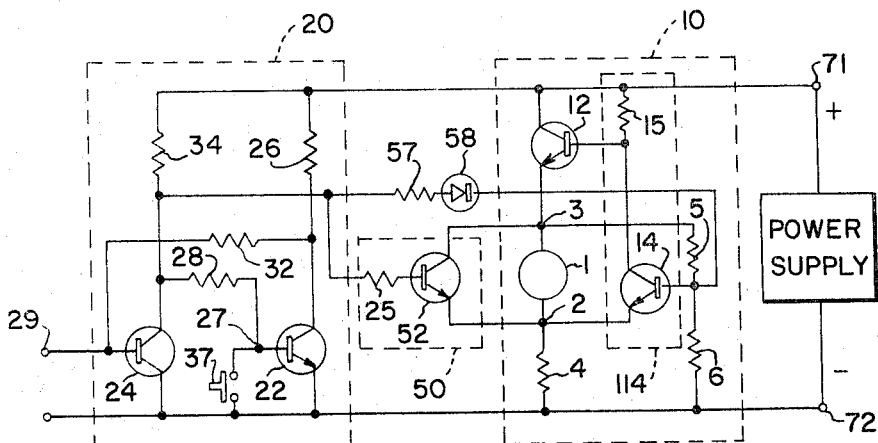
FIG.4
INVENTORS
YOSHIAKI IGARASHI
KAZUTSUGU KOBAYASHI
BY Wenderoth, Lind & Ponack
ATTORNEYS INVENTORS
YOSHIAKI IGARASHI
KAZUTSUGU KOBAYASHI
BY Wenderoth, Lind & Ponack
ATTORNEYS

United States Patent Office 3,440,511
Patented Apr. 22, 1969

---

3,440,511
D.C. MOTOR CONTROL SYSTEM
Yoshiaki Igarashi and Kazutsugu Kobayashi, Kadoma-shi, Japan, assignors to Western Electric Company, Incorporated, New York, N.Y., a corporation of New York
Filed Feb. 14, 1967, Ser. No. 615,969
Claims priority, application Japan, Feb. 16, 1966, 41/9,856; May 7, 1966, 41/29,258
Int. Cl. H02p 5/00, 7/00
U.S. Cl. 318—269                                11 Claims

---

ABSTRACT OF THE DISCLOSURE

A D.C. motor control system adapted for auto-tuning radio receivers comprising a speed control circuit, a braking circuit and a bistable circuit, the speed control circuit making it possible for a D.C. motor to rotate at a substantially constant speed, the braking circuit stopping the motor immediately with only a negligible over running in response to a weak signal, said speed control circuit comprising a bridge circuit formed of the D.C. motor and three resistors as well as an amplifying circuit and a power control circuit, said braking circuit comprising a transistor, and said bistable circuit having a flip-flop means for controlling said speed control circuit and said braking circuit.

---

BACKGROUND OF THE INVENTION

Field of the invention

This invention relates to electronic systems for controlling the operation of a D.C. motor, and particularly to electronic systems capable of controlling both the speed and the braking of a D.C. motor, and more particularly it relates to a D.C. motor control system adapted for an automatic motor turntable, or auto-tuning radio.

A recent development in the electronic industry has required a D.C. motor capable of rotating at a constant speed regardless of any variation in the supply voltage, stopping immediately at any desired time, and remaining fixed in the stopping position. For instance, an auto-tuning radio receiver can include such a D.C. motor coupled with auto-tuning means. Such a D.C. motor is required to stop immediately when the receiver receives a particular radio frequency and to remain in the stopping position to make it possible for the receiver to receive the radio signal in a stable manner.

Prior art

A D.C. motor usually needs time to stop completely from full speed rotation when the current applied to the motor is switched off. The time generally increases with an increase in the speed of the D.C. motor. It is desirable to reduce the time necessary for stopping to as short a time as possible. According to a conventional method, for example, the time is reduced by using a relay to provide a short circuit between two brushes of the D.C. motor. The relay, however, cannot eliminate the time delay and is apt to fail after a long period of operation. Therefore, it is desirable to eliminate mechanical parts such as relays.

In addition, the use of a D.C. motor in an auto-tuning radio requires a D.C. motor control system which drives and stops with only a low power electric signal. Various D.C. motor control systems which satisfy individual requirements along those set forth are known. However, there is no D.C. motor control system available which satisfies all of the above requirements at the same time.

SUMMARY OF THE INVENTION

Therefore, an object of the invention is to provide a D.C. motor control system capable of rotating the motor at a substantially constant speed regardless of any variation in the supply voltage, and at the same time being able to stop the motor immediately at any desired time and hold the shaft of the motor at the stopping position, said D.C. motor control system being characterized by a transistorized electric circuit and an easy operation and the use of a low power electric signal.

Another object of the invention is to produce a D.C. motor control system capable of easily predetermining the speed of a D.C. motor.

The D.C. motor control system according to the invention comprises a speed control circuit, a braking circuit and a bistable circuit, the speed control circuit making it possible for the D.C. motor to rotate at a substantially constant speed and the braking circuit stopping the motor immediately with only a negligible over running, said speed control circuit comprising a bridge circuit formed of the D.C. motor and three resistors as well as an amplifying circuit and a power control circuit, said braking circuit comprising a transistor, and said bistable circuit having a flip-flop means for controlling said speed control circuit and said braking circuit.

BRIEF DESCRIPTION OF THE DRAWINGS

The invention will be set forth in the following detailed description taken together with the accompanying drawings, in which:

FIG. 1 is a circuit diagram illustrating a first embodiment of a D.C. motor control system according to the invention;

FIG. 2 is a circuit diagram of a bridge circuit for illustrating a method of detecting a counter electro-motive force (E.M.F.) in the circuit of FIG. 1;

FIG. 3 is an equivalent circuit for the bridge circuit of FIG. 2, which illustrates a method of predetermining the speed of a D.C. motor;

FIG. 4 is a circuit diagram illustrating a second embodiment of a D.C. motor control system in accordance with the invention;

DESCRIPTION OF PREFERRED EMBODIMENTS

Figure 5:
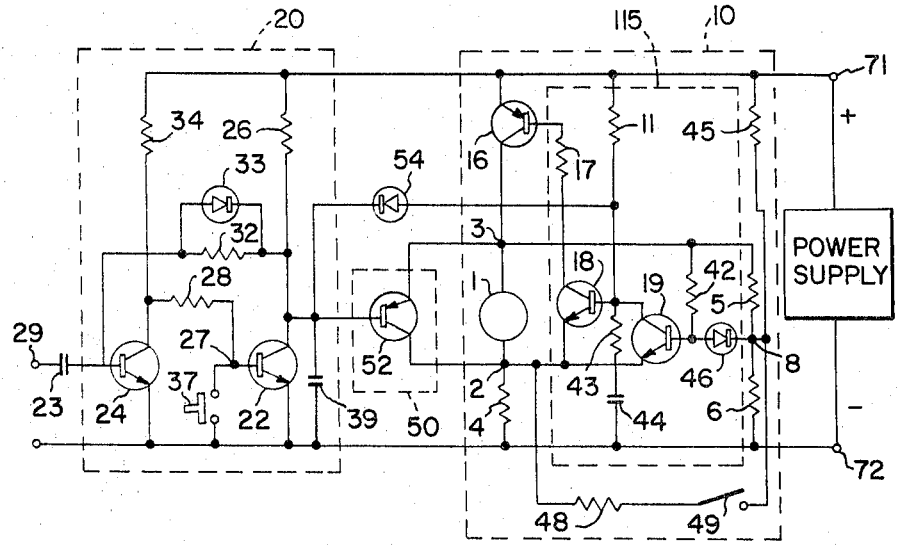
FIG. 5 is a circuit diagram illustrating a third embodiment of a D.C. motor control system in accordance with the invention.

The novel D.C. motor control systems for controlling both the speed and the braking of a D.C. motor according to the invention comprise three principal circuits, i.e.

(1) A speed control circuit by which a separately excited D.C. motor rotates at a substantially constant velocity regardless of any variation in the applied voltage and in the load torque, (2) A braking circuit capable of immediately stopping the D.C. motor at any desired time, and (3) A bistable circuit for controlling the operation of the speed control circuit (1) and the braking circuit (2).

Referring to FIG. 1, the dotted line designated by reference numeral 10 encloses said speed control circuit (1), the dotted line 50 encloses said braking circuit (2) and dotted line 20 encloses said bistable circuit (3).

In said speed control circuit 10, a first resistor 4 is connected between a first terminal 2 of a separately excited D.C. motor 1 and a first terminal 72 of a D.C. power supply. The emitter-collector path of an n-p-n type power control transistor 12 is connected between a second terminal 3 of said D.C. motor and a second terminal 71 of said D.C. power supply. Series connected second resistor 5 and third resistor 6 are connected between said second terminal 3 of said D.C. motor 1 and said first terminal 72 of said D.C. power supply. The base of said power control transistor 12 is coupled to an output terminal of an amplifier enclosed in dotted line 114. A pair of input terminals for said amplifier are connected across said first terminal 2 of said D.C. motor 1 and a detecting terminal 8 which is the junction between said second resistor 5 and said third resistor 6.

The amplifying means of said amplifier 114 can be any amplifying means such as a single transistor or a combination of at least two transistors, or the like.

Said braking circuit 50 comprises a p-n-p type transistor 52 having a base, an emitter and a collector. The emitter-collector path of said transistor 52 is connected across said first terminal 2 and said second terminal 3 of D.C. motor 1.

Said bistable circuit has means for producing two different currents and is provided with a first input terminal 27 and a second input terminal 29. Said bistable circuit is coupled with both the aforesaid speed control circuit 10 and the aforesaid braking transistor 52 so that either said speed control circuit 10 or said braking transistor 52 operates, depending which of said two different current flows is produced.

In said speed control circuit 10, said second and third resistors 5 and 6 form in association with said D.C. motor 1 and said first resistor 4, a bridge circuit. Said amplifier 114 is comprised of a single n-p-n type transistor 14 and a resistor 15. The base and emitter of transistor 14 correspond to the pair of input terminals of said amplifier 114. The base of said transistor 14 is connected to said detecting terminal 8 and the emitter of said transistor 14 is connected to said first terminal 2 of said D.C. motor 1. The collector of said transistor 14 corresponding to the output terminal of said amplifier 114 is connected to the base of said power control transistor 12. Said resistor 15 is connected across said second terminal 71 of a power supply and the collector of said transistor 14.

Referring to FIG. 2, said D.C. motor 1 is replaced by both the resistor $R_a$ equivalent to the armature circuit impedance of D.C. motor 1 and the counter E.M.F. $E_a$ which is proportional to the motor speed. The bridge circuit shown in FIG. 2 detects a detecting voltage $E_d$ across said first terminal 2 of D.C. motor 1 and the detecting terminal 8. Said detecting voltage $E_d$ is the potential difference between said terminal 2 and said detecting terminal 8 and is defined as follows:

$$E_d = \left(\frac{R_3}{R_2+R_3} - \frac{R_1}{R_a+R_1}\right)E_b + \frac{R_1+R_3}{R_a+R_1+R_2+R_3}L_a \quad (1)$$

wherein $R_1$, $R_2$ and $R_3$ are the electric resistances of said first resistor 4, said second resistor 5 and said third resistor 6, respectively, and $E_b$ is the voltage supplied to said bridge circuit across said second terminal 3 of D.C. motor 1 and the first terminal 72 of power supply. When the resistance of the bridge circuit is governed by the following equation:

$$\frac{R_1}{R_a}\frac{R_3}{R_2} = r \quad (2)$$

Equation 1 can be written as follows, $$E_d = \frac{R_1+R_3}{R_a+R_1+R_2+R_3}E_a = \frac{r}{1+r}E_a \quad (3)$$

The detecting voltage $E_d$ is seen to be proportional to the counter E.M.F. $E_a$. Thus, a voltage proportional to the counter E.M.F. appears between said terminal 2 and said detecting terminal 8 in the bridge circuit regardless of the voltage $E_b$ supplied to the bridge circuit and regardless of the torque of the motor shaft load which is proportional to armature current.

Since the detecting voltage $E_d$ represents the speed of said D.C. motor 1, the speed of said D.C. motor 1 can be regulated as long as the detecting voltage $E_d$ is regulated so as to be kept constant. An error voltage $E_e$ can be represented by the following equation:

$$E_e = E_d - E_r$$

The error voltage is amplified and used for controlling the impedance of the emitter-collector path of said transistor 12 so as to control the current flowing through the armature of said D.C. motor 1. In the circuit described in FIG. 1, the reference voltage $E_r$ does not appear explicitly and is a voltage defined by a characteristic voltage at the base-emitter junction of the transistor 14. Therefore, said error voltage $E_e$ can be determined by consideration of said characteristic voltage of the transistor 14.

Referring to the equivalent circuit of FIG. 3, reference character $R_b$ designates the output impedance of said bridge circuit between said terminals 2 and 8 and $R_s$ is a resistance 48 which can be added between said terminals 2 and 8 by closing switch 49. In such an equivalent circuit, the detecting voltage $E'_d$ is reduced to an attenuated voltage $E'_d$ as follows:

$$E'_d = \frac{R_s}{R_b+R_s}E_d \quad (4)$$

Therefore, now the reference voltage $E_r$ is not changed and the detecting voltage is attenuated by providing the attenuation resistance $R_s$ between the detecting terminals of the bridge circuit. The speed of said D.C. motor 1 is increased until the attenuated detecting voltage reaches the reference voltage $E_r$. In such a way, the motor speed can be changed. Therefore, said presence of resistance $R_s$ across terminals 2 and 8 makes it possible to achieve the intended speed of the D.C. motor easily.

Referring further to FIG. 1, reference character 50 designates a braking circuit comprising the transistor 52 which has a base, an emitter and a collector. Said emitter and said collector are connected to said second terminal 3 and said first terminal 2 of said D.C. motor 1, respectively. The speed of said D.C. motor 1 is controlled so as to remain constant by said speed control circuit 10. When the D.C. motor is required to stop, the current flowing to the D.C. motor 1 needs to be switched off. Even when the current to said D.C. motor 1 is switched off, the armature of D.C. motor continues to rotate for a moment due to its moment of inertia until the D.C. motor stops completely.

During the rotation of said armature of said D.C. motor 1, a counter E.M.F. is induced across said first terminal 2 and said second terminal 3 of said D.C. motor 1. In order to stop the armature of said D.C. motor 1 immediately at the desired time, said first terminal 2 and said second terminal 3 of said D.C. motor 1 is shunted by the low impedance of the collector-emitter path of transistor 52. The current flowing through the armature generates a braking force in a direction opposite to the rotational direction.

Referring still further to FIG. 1, bistable circuit 20 includes resistors 26 and 34 which are collector load resistances for a first n-p-n type transistor 22 and a second n-p-n type transistor 24, respectively. The collector of said second transistor 24 is connected through a resistor 28 to the base of said first transistor 22. The base of said second transistor 24 is connected through another resistor 32 to the collector of said first transistor 22. The emitters of said first transistor 22 and second transistor 24 are connected to said first terminal 72 of the power supply. There is a high D.C. voltage gain between the base of said second transistor 24 and the collector of said first transistor 22 when said transistors 22 and 24 are in an active state. An increase in the base current of said second transistor 24 results in an increase in the collector voltage of said first transistor 22 and an increase in the collector voltage of said first transistor 22 causes an increase in the base current of said second transistor 24, through the resistor 32. Thus, a positive feedback can be accomplished, and the circuit 20 can be made to be a flip-flop circuit which has a bistable state for controlling the operation of aforesaid speed control circuit 10 and aforesaid braking circuit 50.

There are two conditions of said D.C. motor; one is that in which said D.C. motor rotates at a constant speed and the other is that in which said D.C. motor is stopped. Said D.C. motor is required to stop immediately and to remain fixed in the stopped poistion.

Said D.C. motor rotates when the transistor 22 is cut off and stops when said transistor 22 is conductive. It is necessary that the transistor 52 not be conductive during the time when the D.C. motor is controlled so as to rotate at a constant speed.

It is also necessary that the impedance of the emitter-collector path of the transistor 52 be low in order to reduce the over running of the D.C. motor when the D.C. motor rotating at a constant speed is stopped. This requirement can be met by connecting the base of the transistor 52 directly to the collector of the transistor 22 when the transistors 52 and 22 are different types, as shown in FIG. 1.

In addition, the power control transistor 12 must supply no current to the D.C. motor 1 when the D.C. motor is in the stopped condition. This can be achieved by making the base current of the power control transistor 12 zero.

One method of accomplishing this is to connect the anode of a diode 54 to the collector of the transistor 14, as shown in FIG. 1, and the cathode to the collector of transistor 22. The circuit of FIG. 4 illustrates alternative ways of meeting the above mentioned two requirements. In FIG. 4, the base of the transistor 52 is connected to the collector of the transistor 24 through a resistor 25 when the transistors 52 and 22 are of the same type. Also the cathode of a diode 58 is connected to the base of the transistor 14 and the anode of the diode 58 is connected to the collector of the transistor 24 through a resistor 57.

The other components of FIG. 4 are arranged in a manner similar to that of FIG. 1.

With such connections, the base potential of the transistor 12 is nearly equal to that of the first terminal 72 of the power supply and the base current of the transistor 12 becomes zero due to the characteristics of the base-emitter junction of the transistor 12. Accordingly, the D.C. motor 1 is not supplied with a current and kept in the stopped condition.

A starting switch 37 is provided between the first input terminal 27 and the negative terminal 72 of the power supply.

When said starting switch 37 is pushed to short the base and the emitter of said first transistor 22, said transistor 22 is no longer in its saturated state with respect to the collector current so that it actuates said speed control circuit 10 and switches it to the condition in which said D.C. motor rotates at a constant speed.

When negative voltage signal is applied to said second input terminal 29 of said bistable circuit 20 so that said second switching transistor 24 is no longer in its saturated state with respect to the collector current, the D.C. motor is stopped and held in the stopped position.

The negative voltage signal applied to the second input terminal 29 can be supplied from the apparatus to be controlled. For example, in an auto-tuning radio, the motor starts to rotate when actuated by a scanning signal or a starting signal, which is usually provided by a push button switch such as switch 37, and simultaneously tuning means such as variable capacitors coupled to the motor moves. If the receiver tunes a radio frequency signal, the intermediate frequency signal gets stronger. This intermediate frequency signal is filtered by a narrow band IF filter and is rectified negatively after being amplified. This rectified negative signal is applied to the input terminal 29, and then D.C. motor stops and the tuned radio frequency continues to be received in a stable manner.

Referring to FIG. 5 wherein similar reference characters designate similar components, the emitter of a power control p-n-p type transistor 16 is connected to a second terminal 71 of a power supply and the collector of said power control transistor 16 is connected to a second terminal 3 of a D.C. motor 1. A bridge circuit is constituted by a second resistor 5 and a third resistor 6 connected in parallel with a series connected D.C. motor 1 and a first resistor 4. An amplifier 115 in FIG. 5 corresponds to said amplifier 114 in FIG. 1 and is constituted by a first amplifying n-p-n type transistor 19, a second amplifying n-p-n type transistor 18, a diode 46, resistors 11, 17, 42, 43 and a capacitor 44. The collector of said transistor 18 corresponds to the output terminal of said amplifier 115 and is connected through said resistor 17 to the base of said power control transistor 16. A cathode of said diode 46 corresponding to one of the aforesaid pair of input terminals is connected to a detecting terminal 8 which is the junction point of said second resistor 5 and said third resistor 6. The anode of said diode 46 is connected to the base of said first amplifying transistor 19. Said resistor 42 is connected between said second terminal 3 of said D.C. motor 1 and the anode of said diode 46 for feeding a bias current to said diode 46. The emitter of said first amplifying transistor 19 corresponding to another input terminal of aforesaid pair of input terminals of said amplifier 115 is connected to said first terminal 2 of said D.C. motor 1, as is the emitter of said second amplifying transistor 18. The collector of said first amplifying transistor 19 is connected to the base of said second amplifying transistor 18. Said resistor 11 is connected across the collector of said first amplifying transistor 19 and said second terminal 71 of the power supply. Said resistor 43 and said capacitor 44 are connected in series between the collector of said first amplifying transistor 19 and said first terminal of the power supply so as to restrain undesired oscillation in this speed control feedback loop.

The other components of the circuit of FIG. 5 are arranged in the same manner as the circuit of FIG. 1.

When the speed of said D.C. motor 1 decreases, a detecting voltage across said first terminal 2 of said D.C. motor 1 and said detecting terminal 8 also decreases and first amplifying transistor 19 becomes less conductive similar to the operation of the circuit of FIG. 1. The collector current from the transistor 19 through the resistor 11 decreases, whereas both the base current and the collector current of transistor 18 increase. Thus, the base current of the transistor 16 increases and transistor 16 becomes more conductive. Consequently, the voltage applied to the bridge circuit or to said D.C. motor 1 increases so as to increase the speed of said D.C. motor 1. Such a loop forms a negative feedback loop to hold the speed of said D.C. motor 1 constant.

A decrease in the power supply voltage or an increase in the motor load increases the conductance of the transistor 16 so as to decrease the voltage across the emitter and the collector of the transistor 16. Because the emitter of the transistor 18 is connected to said first terminal 2 of said D.C. motor 1, the emitter-base voltage of the transistor 18 does not act as a voltage loss in the circuit 10. Since the power supplying transistor 16 is connected as a common-emitter type and is provided with a sufficient base current, the transistor 16 can be saturated by the voltage across the collector and the emitter thereof. Therefore, almost all of the power supply voltage is applied to the series connection of said D.C. motor 1 and said first resistor 4.

A reference voltage defined by the characteristic voltage at the base-emitter junction of transistor 19, similar to the case of FIG. 1, varies with a variation in the ambient temperature. The variation in the reference voltage can be removed by employing the diode 46 and the resistor 42 in accordance with the invention. Referring again to FIG. 5, the diode 46 is inserted between the first amplifying transistor 19 and said detecting terminal 8. Said diode 46 is provided with a current flowing through said resistor 42. Said current is nearly constant even when the supply voltage changes, because said current is fed from said second terminal 3 of said D.C. motor 1, at which the voltage is regulated so as to be nearly constant during normal operation of said D.C. motor 1. Said reference voltage $E_r$ is expressed as follows:

$$E_r = V_{be} - V_d \qquad (5)$$

wherein $V_{be}$ is the base-emitter voltage of the transistor 19 and $V_d$ is forward voltage drop of the diode 46 which is provided with said nearly constant current. Since the temperature coefficient of the $V_d$ can be chosen so as to be nearly equal to that of $V_{be}$, said reference voltage $E_r$ becomes constant regardless of environmental temperature. A resistor 45 is inserted between said second terminal 71 of a power supply and said detecting terminal 8 and operates as a compensation resistance for the variation of the power supply. If there is no change in the conditions of said D.C. motor 1, the potential of the collector of said first amplifying transistor 19 is required to be constant regardless of a variation in the supply voltage. When the power supply voltage becomes high, the current through the resistor 45 increases and the voltage at said detecting terminal 8 goes up and the collector current from the transistor 19 through the resistor 11 increases to hold the voltage at the collector of said first amplifying transistor 19 constant.

The speed of said D.C. motor 1 can be predetermined by a resistor 48 and a switch 49 which are inserted between said first terminal 2 of said D.C. motor 1 and the detecting terminal 8. Said resistor 48 corresponds to the aforesaid resistance $R_s$ and can constitute the speed predetermining means in accordance with Equation 4 and the corresponding description.

It is desirable for some applications, such as auto tuning radios, that the D.C. control system does not actuate the D.C. motor to rotate solely in response to a supply of power to the system.

A capacitor 39 connected between the collector of said transistor 22 and said first terminal 72 of the power supply ensures that the transistor 24 is in an off state and the transistor 22 is in an on state when power is applied to the circuit.

A starting switch 37 is connected between said first terminal 72 of the power supply and the base of said first switching transistor 22.

When the control signal for stopping the motor is applied to a base of said second switching transistor 24 through a capacitor 23 from an input terminal 29, a negative signal turns the flip-flop so as to cut off said transistor 24 and to turn on said transistor 22, and said D.C. motor 1 is then braked. Recovering or fading out of said negative signal turns said transistor 24 on and said transistor 22 off and drives the motor again. Such undesired operation can be eliminated by employing a diode 33. The anode of said diode 33 is connected to the base of said second switching transistor 24 and the cathode of said diode 33 is connected to the collector of said first switching transistor 22. When said transistor 24 is off and said transistor 22 is on, a positive signal supplied to the base of said second switching transistor 24 is shunted by the series circuit comprised of the diode 33 and the collector-emitter path of said transistor 22 and is attenuated so that the state of the flip-flop does not change.

Figure 6:
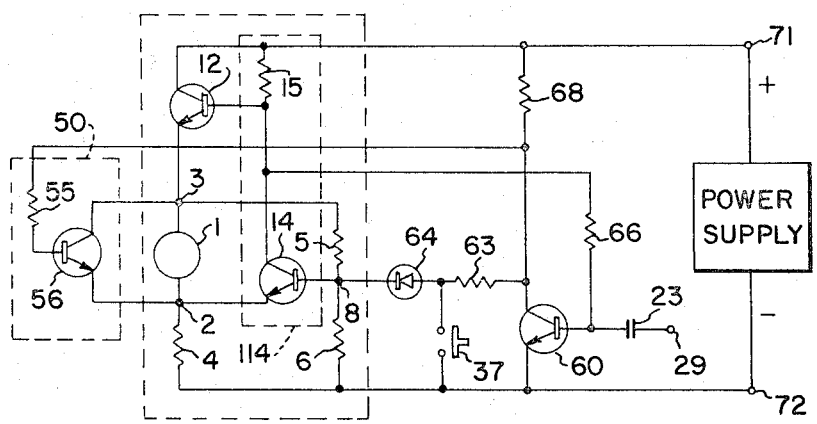
FIG. 6 is a circuit diagram illustrating a fourth embodiment of a D.C. motor control system in accordance with the invention.

FIG. 6 shows the circuit of a further preferred embodiment of this invention. The number of transistors which are necessary to construct the circuit are reduced to four and the bistable circuit does not appear to be present.

An n-p-n type transistor 14 in speed control circuit 10 and an n-p-n type transistor 60 form a positive feedback loop having bistable states. A resistor 68 is the collector resistance of said transistor 60. The base of said transistor 60 is connected through a resistor 66 to the collector of said transistor 14. A diode 64 is connected in series with a resistor 63 between the collector of said transistor 60 and a detecting terminal 8 of a bridge circuit comprising the second resistor 5 and the third resistor 6 connected in parallel with a series connected D.C. motor 1 and a first resistor 4. The cathode of said diode 64 is connected to the detecting terminal 8. When the starting switch 37 is switched on, current through said diode 64 is cut off and said speed control circuit 10 starts to operate. When the speed of said D.C. motor 1 is controlled so as to be constant, the potential of the collector of said transistor 14 is high enough to supply the base current of said transistor 60 through the said resistor 66, and then said transistor 60 is saturated with respect to the current. The diode 64 becomes back biased and the speed control circuit 10 operates independently of the diode 64 to keep the motor rotating stably, even after the starting switch 37 is opened.

When a negative pulse is applied to the terminal 29, the transistor 60 is cut off and the potential of the collector of said transistor 60 becomes high, and a current flows through the resistor 63 and the diode 64 to fully saturate the transistor 14 with respect to the current. The collector current of the transistor 14 flows through a resistor 15, and the voltage potential of the collector of said transistor 14 drops. The potential drop at the collector of said transistor 14 results in changing the conditions of both said transistor 12 and said transistor 60 to the off condition. In the off condition of said transistor 12 no current flows through the emitter and said D.C. motor 1 is caused to stop. In such a way, the off condition of said transistor 60 can cause said D.C. motor 1 to remain stopped. When said transistor 60 is in the off condition, a current flows to the base of a transistor 56 through a resistor 55 so as to brake the motor in similar way to that illustrated with reference to FIG. 1 and FIG. 4.

The novel D.C. motor control system specified above can immediately stop the D.C. motor. For example, when a D.C. motor having an armature with 1 gr.-cm.$^2$ moment of inertia is rotating at a speed of 3000 r.p.m., the over running rotational angle of the armature is about 180 degrees when it is stopped by the control circuit in accordance with the invention, whereas it is about 900 degrees for a conventional D.C. motor control system having no braking circuit. An auto-tuning radio receiver comprising the novel D.C. motor control system can make it possible to reduce the deviation in the tuning frequency to one-fifth that of the conventional system when the searching time required to search all the frequency band is equal to each other.

The novel D.C. motor control system can hold the motor speed constant with less than 1% tolerance when a supply voltage changes from 7.5 to 4.5 volts, and less than 3% tolerance when the load torque changes from 0 to 5 gr.-cm.

It is necessary in order to obtain a high precision of the speed of the motor that the resistor 4 of the aforesaid bridge circuit be made of the same material as that of the armature winding and that said second resistor 5 be made of the same material as that of said third resistor 6, in addition to providing temperature compensation of the reference voltage.

The resistance $R_1$ of aforesaid first resistor 4 is basically determined by the Equation 2. However, the resistance $R_1$ can be changed in accordance with the following Equation 6 depending on the desired torque-speed characteristic of the motor:

$$R_1 < \frac{R_a R_3}{R_2} \qquad (6)$$

The resistance $R_1$ defined by the Equation 6 can make it possible for a starting torque to increase even at a low power supply voltage although it impairs the torque-speed characteristic.

It is possible that the resistance $R_1$ can be zero. In this case, the aforesaid circuit 10 acts as a constant voltage control circuit to hold the voltage supplied to the motor constant.

It should be understood that this invention is not limited to the specified embodiments herein illustrated and described. The scope of the invention is defined by the following claims.

What is claimed is:

1. A D.C. motor control system for controlling both the running speed and the braking and holding of a D.C. motor in the stopped position, said system comprising a D.C. motor having a first and a second terminal; a D.C. power supply having a first and a second terminal; a speed control circuit including a first resistor connected between the first terminal of said D.C. motor and the first terminal of said D.C. power supply, a power control transistor having a base, an emitter and a collector, the emitter-collector path of said power control transistor being connected between the second terminal of said D.C. motor and the second terminal of said D.C. power supply, a second and a third resistor connected in series between the second terminal of said D.C. motor and the first terminal of said D.C. power supply, an amplifier having a pair of input terminals and an output terminal, said input terminals being connected across the first terminal of said D.C. motor and the junction point of said second and third resistors, said output terminal being coupled to the base of said power control transistor; a braking transistor having a base, an emitter and a collector, the emitter-collector path of said braking transistor being connected across the first and second terminals of said D.C. motor; and a bistable circuit producing two different voltage levels, said bistable circuit being coupled to said braking transistor for alternatively causing said emitter-collector path of said braking transistor to be conductive and non-conductive according to the voltage level of said bistable circuit, and being coupled to said speed control circuit for alternately causing the speed control circuit to be conductive and non-conductive when said braking transistor is non-conductive and conductive, respectively, according to the voltage level of said bistable circuit.

2. A D.C. motor control system as claimed in claim 1, and further including a fourth resistor connected between the first terminal of said D.C. motor and the junction point of said second and third resistors, said fourth resistor being for determining the desired speed of said D.C. motor.

3. A D.C. motor control system as claimed in claim 1, wherein a diode is connected between said bistable circuit and said speed control circuit.

4. A D.C. motor control system as claimed in claim 1, wherein said bistable circuit comprises a flip-flop circuit including first and second switching transistors, each of which has a base, an emitter and a collector, one of said switching transistors being alternatively conductive.

5. A D.C. motor control system as claimed in claim 4, wherein said bistable circuit includes an input path for a stop signal for said D.C. motor coupled to the base of said second switching transistor, said input path having a capacitor therein, and further includes a diode connected between the base of said second switching transistor and the collector of said first switching transistor, said diode being reverse biased when said second transistor is conducting.

6. A D.C. motor control system as claimed in claim 1, wherein said amplifier includes at least one transistor having a base, an emitter and a collector.

7. A D.C. motor control system as claimed in claim 6, wherein said amplifier comprises temperature compensation means, said temperature compensation means including at least one diode connected in series between the junction point of said second and third resistors and the corresponding input terminal of said amplifier, and a temperature compensating resistor through which said diode is supplied with substantially constant forward biasing current connected between the second terminal of said D.C. motor and said corresponding input terminal of said amplifier.

8. A D.C. motor control system as claimed in claim 6, wherein said amplifier consists of a transistor having a base, an emitter and a collector and being of the same conductivity type as said power control transistor, said base and emitter being said pair of input terminals and being connected to the junction point of said second and third resistors and the first terminal of said D.C. motor, respectively, and said collector being said output terminal and being connected to the base of said power control transistor.

9. A D.C. motor control system as claimed in claim 8, wherein said bistable circuit comprises a switching transistor having a base, an emitter and a collector, the base and the collector of said switching transistor being conductively connected with the collector and the base of said transistor in the speed control circuit, respectively, said transistors forming the bistable circuit.

10. A D.C. motor control system as claimed in claim 6, wherein said amplifier consists of a first and a second amplifying transistor, each of which have a base, an emitter and a collector and which are of the opposite conductivity type from said power control transistor, the base and emitter of said first amplifying transistor being connected to the junction point of said second and third resistors and the first terminal of said D.C. motor, respectively, the collector of said first amplifying transistor being coupled with the base of said second amplifying transistor, and the emitter and collector of said second amplifying transistor being coupled with the first terminal of said D.C. motor and the base of said power control transistor, respectively.

11. A D.C. motor control system as claimed in claim 1 and further comprising a supply voltage variation reducing resistor coupled between the second terminal of said D.C. power supply and the junction point of said second and third resistors for reducing the effect of the D.C. power supply voltage variation.

References Cited

UNITED STATES PATENTS

| 3,188,547 | 6/1965 | Zelina | 318—380 XR |
| 3,371,259 | 2/1968 | James et al. | 318—269 |

ORIS L. RADER, *Primary Examiner.*

K. L. CROSSON, *Assistant Examiner.*

U.S. Cl. X.R.

318—331, 380

U.S. DEPARTMENT OF COMMERCE

PATENT OFFICE

Washington, D.C. 20231

UNITED STATES PATENT OFFICE
CERTIFICATE OF CORRECTION

Patent No. 3,440,511                                                             April 22, 1969

Yoshiaki Igarashi et al.

It is certified that error appears in the above identified patent and that said Letters Patent are hereby corrected as shown below:

In the heading to the printed specification, lines 4 and 5, "Western Electric Company, Incorporated, New York, N. Y., a corporation of New York" should read -- Matsushita Electric Industrial Co., Ltd., Osaka, Japan a corporation of Japan --.

Signed and sealed this 7th day of April 1970.

(SEAL)
Attest:

Edward M. Fletcher, Jr.                                    WILLIAM E. SCHUYLER, JI
Attesting Officer                                                 Commissioner of Patents